(12) United States Patent
DeGutis et al.

(10) Patent No.: US 6,402,547 B1
(45) Date of Patent: Jun. 11, 2002

(54) ANTI-THEFT IRONING SYSTEM

(75) Inventors: Michael P. DeGutis, Port Jefferson, NY (US); James L. Glenn, St. Louis, MO (US); Brian P. Williams, Glen Allen, VA (US)

(73) Assignees: Courtesy Products, LLC, St. Louis, MO (US); Hamilton Beach/Proctor-Silex, Inc., Glenn Allen, VA (US)

( * ) Notice: Subject to any disclaimer, the term of this patent is extended or adjusted under 35 U.S.C. 154(b) by 0 days.

(21) Appl. No.: 09/765,118

(22) Filed: Jan. 18, 2001

(51) Int. Cl.[7] .............................................. H01R 11/00
(52) U.S. Cl. ........................ 439/502; 439/680; 439/501
(58) Field of Search ..................... D13/139.2; 174/135; 439/502, 680, 369, 620, 505, 501

(56) References Cited

U.S. PATENT DOCUMENTS

| | | | |
|---|---|---|---|
| 2,047,060 A | | 7/1936 | Craig |
| 2,271,463 A | | 1/1942 | Reeves |
| 2,715,002 A | | 8/1955 | Davis |
| 3,250,030 A | | 5/1966 | Lapastora |
| 3,520,988 A | * | 7/1970 | Ballock, Sr. ................ 174/135 |
| 4,403,824 A | * | 9/1983 | Scott .......................... 439/680 |
| 4,810,199 A | | 3/1989 | Kar |
| 4,815,992 A | * | 3/1989 | Aranzabal .................. 439/620 |
| 5,030,119 A | | 7/1991 | Lowe |
| 5,290,998 A | | 3/1994 | Couch et al. |
| 5,472,157 A | | 12/1995 | Lehrman |
| D399,822 S | | 10/1998 | Starec et al. |
| D400,173 S | | 10/1998 | Starec et al. |
| D407,372 S | | 3/1999 | Starec et al. |
| 5,885,098 A | * | 3/1999 | Witkoski ..................... 439/369 |
| 5,909,862 A | | 6/1999 | Ratliff et al. |
| 5,926,984 A | | 7/1999 | Zuber |
| 5,961,207 A | * | 10/1999 | Petkovic ...................... 362/376 |
| 6,050,859 A | | 4/2000 | Abe et al. |

* cited by examiner

Primary Examiner—Gary Paumen
Assistant Examiner—James R. Harvey
(74) Attorney, Agent, or Firm—Thompson Coburn LLP (57) ABSTRACT

A theft-deterrent ironing system comprises an electrical extension cord and an electric iron. The electrical extension cord has a female electrical connector at one end and a male electrical connector at an opposite end. The female electrical connector is adapted for mounting to an ironing board. The male electrical connector is adapted to be plugged into a standard electrical receptacle. The electric iron has a power cord with a first end electrically connected to the iron and a second end connected to a modified male electrical connector. The modified male electrical connector has a front face with a peripheral edge margin, a pair of electrical terminal prongs and a flange. The electrical terminal prongs project forwardly from the front face of the modified male electrical connector. The flange projects forwardly from the peripheral edge margin of the front face generally parallel to the electrical terminal prongs. The flange has an interior surface that is adapted to fit over at least a portion of the female electrical connector, when the modified male electrical connector is connected to the female electrical connector. An associated mounting bracket is configured for mounting the electrical extension cord to the ironing board by retaining at least a portion of the female electrical connector within a housing portion of the bracket.

21 Claims, 5 Drawing Sheets

ANTI-THEFT IRONING SYSTEM

BACKGROUND OF THE INVENTION

The present invention pertains to electric irons and ironing boards. More particularly, the present invention relates to an ironing system comprising an electric iron that is configured for use only with an associated ironing board, thereby deterring theft and misuse of the electric iron.

Typically, power cords for electric irons are not long enough to permit easy and satisfactory use of an ironing board, except in close proximity to an electrical outlet. Thus, some ironing board manufacturers have added integral electrical extension cords to their ironing boards. This gives the operator more freedom and a wider range in which to use the iron and ironing board. Typically, the electrical extension cord includes a standard female electrical connector or standard electrical receptacle at one end and a standard male electrical connector or "plug" at the other end. The female end is mounted to the ironing board in a convenient location and the male end is plugged into a standard wall outlet. The electrical iron power cord is then plugged into the female end of the extension cord. An arrangement of this type is disclosed in U.S. Pat. No. 2,271,461, which issued to N.S. Reeves in 1942.

Despite the convenience and freedom afforded by the ironing board having an integral extension cord, hurried or lazy operators occasionally iron on other flat surfaces, such as furniture, carpets, and bedspreads, rather than taking the time to set up the ironing board. This is a common problem for the hotel industry, where hurried hotel guests often do not take the time to set up the ironing board. Such misuse can damage the furniture or other surface on which the iron is used, as well as the electric iron itself.

Another unfortunate problem experienced by the hotel industry is theft of electric irons by hotel guests. To prevent or at least deter such theft, a variety of security devices have been devised, which prevent separation of the electric iron from the ironing board. For example, security coils have been used for securing the electric iron to the ironing board. However, security coils are rather obtrusive and may leave a negative impression on the hotel guest, perhaps suggesting that the guest cannot be trusted. Moreover, such security coils can interfere with the ironing process.

Thus, there is a need for an ironing system that allows the operator the convenience and freedom of using an electric iron in virtually any part of the room the operator desires; that encourages the use of an ironing board; and that deters theft and misuse of the electric iron.

SUMMARY OF THE INVENTION

The shortcomings of the prior art are overcome by the present invention, which provides an anti-theft, anti-misuse ironing system. It is a general object of the present invention to provide an ironing system that deters misuse of the electric iron by encouraging the use of an ironing board. Another general object of the invention is to provide an ironing system that deters theft of the electric iron by making the irons electrical power cord incompatible with standard electrical receptacles. A more specific object of the invention is to provide a theft-deterrent ironing system comprising an electric iron with a power cord having a modified male electrical connector that is shaped and configured for use only with a modified female electrical connector that is mounted to an associated ironing board. Another object of the invention is to provide a theft-deterrent ironing system including a mounting bracket for securing a modified electrical extension cord to an ironing board.

In general, a theft-deterrent ironing system of the present invention comprises an electrical extension cord and an electric iron. The electrical extension cord has a female electrical connector at one end and a male electrical connector at an opposite end. The female electrical connector is adapted for mounting to an ironing board. The male electrical connector is adapted to be plugged into a standard electrical receptacle. The electric iron has a power cord with a first end electrically connected to the iron and a second end connected to a modified male electrical connector. The modified male electrical connector has a front face with a peripheral edge margin, a pair of electrical terminal prongs and a flange or shroud. The electrical terminal prongs project forwardly from the front face of the modified male electrical connector. The flange projects forwardly from the peripheral edge margin of the front face generally parallel to the electrical terminal prongs. The flange has an interior surface that is adapted to fit over at least a portion of the female electrical connector, when the modified male electrical connector is connected to the female electrical connector.

In another aspect of the invention, the electrical extension cord has a modified female electrical connector at one end and a standard male electrical connector at the other end. The modified female electrical connector is fixedly mountable to an ironing board. The standard male electrical connector is adapted to plug into a standard electrical receptacle. The electric iron has an electrical power cord with one end electrically connected to the iron. The other end of the power cord includes a modified male electrical connector. The modified male electrical connector has a front face with a peripheral edge margin, a pair of electrical terminal prongs and a hood. The electrical terminal prongs projects forwardly from the front face of the modified male electrical connector. The hood extends around at least a portion of the peripheral edge margin of the front face and projects forwardly therefrom to at least partially surround the electrical terminal prongs. The hood has an interior surface that is shaped and configured to fit around at least a portion of the modified female electrical connector when the modified male electrical connector is connected to the modified female electrical connector.

In still another aspect of the invention, a theft-deterrent ironing system comprises an electrical extension cord and a mounting bracket. The electrical extension cord has a female electrical connector at one end and a male electrical connector at the other end. The mounting bracket is configured for mounting the electrical extension cord to an ironing board. The bracket has a base portion and a housing portion. The base portion of the bracket is connectable to the ironing board and the housing portion of the bracket extends from the base portion. The housing portion is adapted for engagement with the female electrical connector in a manner for retaining at least a portion of the female electrical connector within the housing portion, thereby securing the female electrical connector to the mounting bracket.

While the principal advantages and features of the present invention have been described above, a more complete and thorough understanding and appreciation for the invention may be attained by referring to the drawings and description of the preferred embodiments, which follow.

Reference characters in these Figures correspond to reference characters in the following detailed description of the preferred embodiments.

DETAILED DESCRIPTION OF THE PREFERRED EMBODIMENTS

Figure 1:
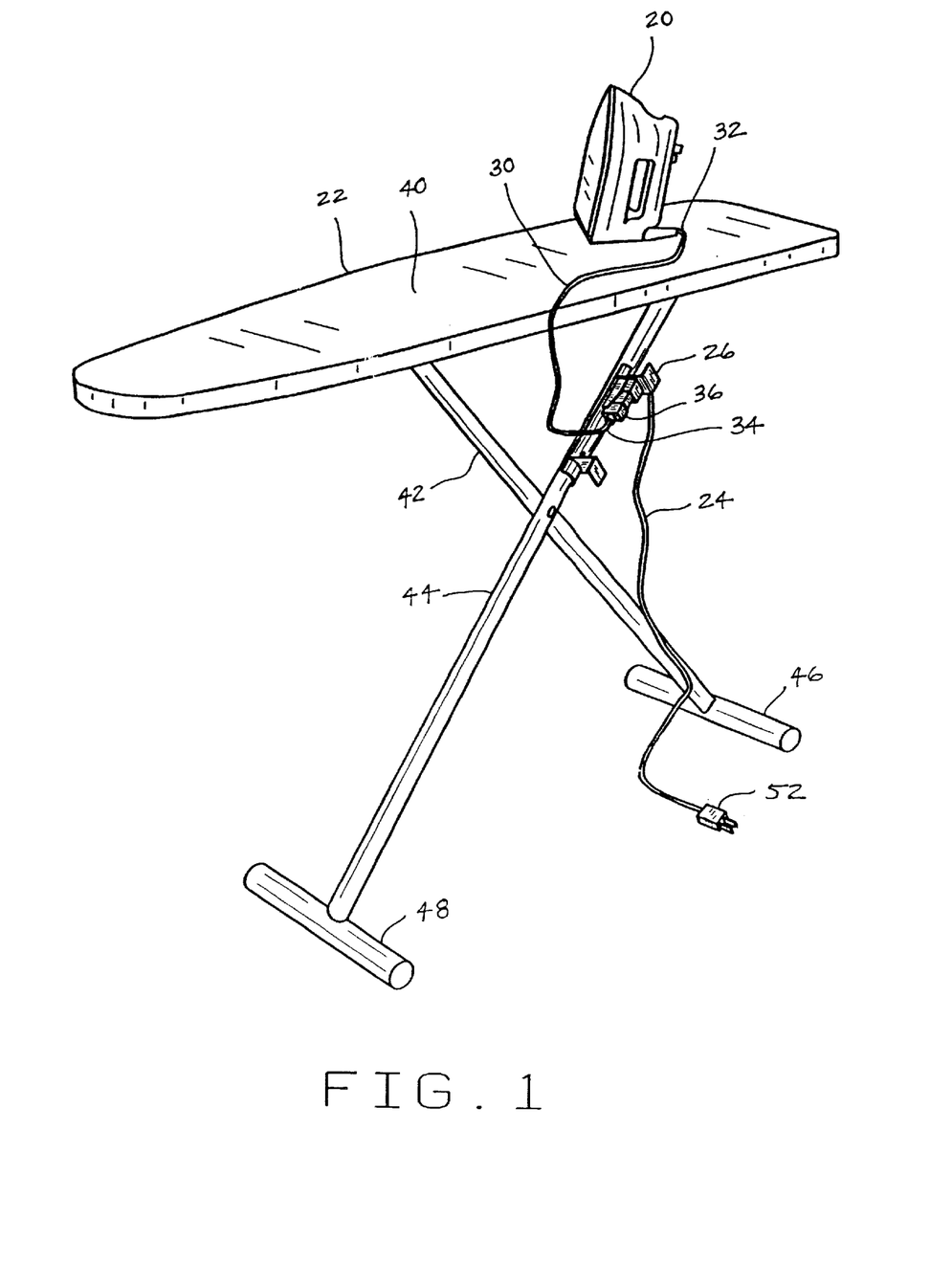
FIG. 1 is a perspective view of an anti-theft ironing system of the present invention.
Figures 2, 3:
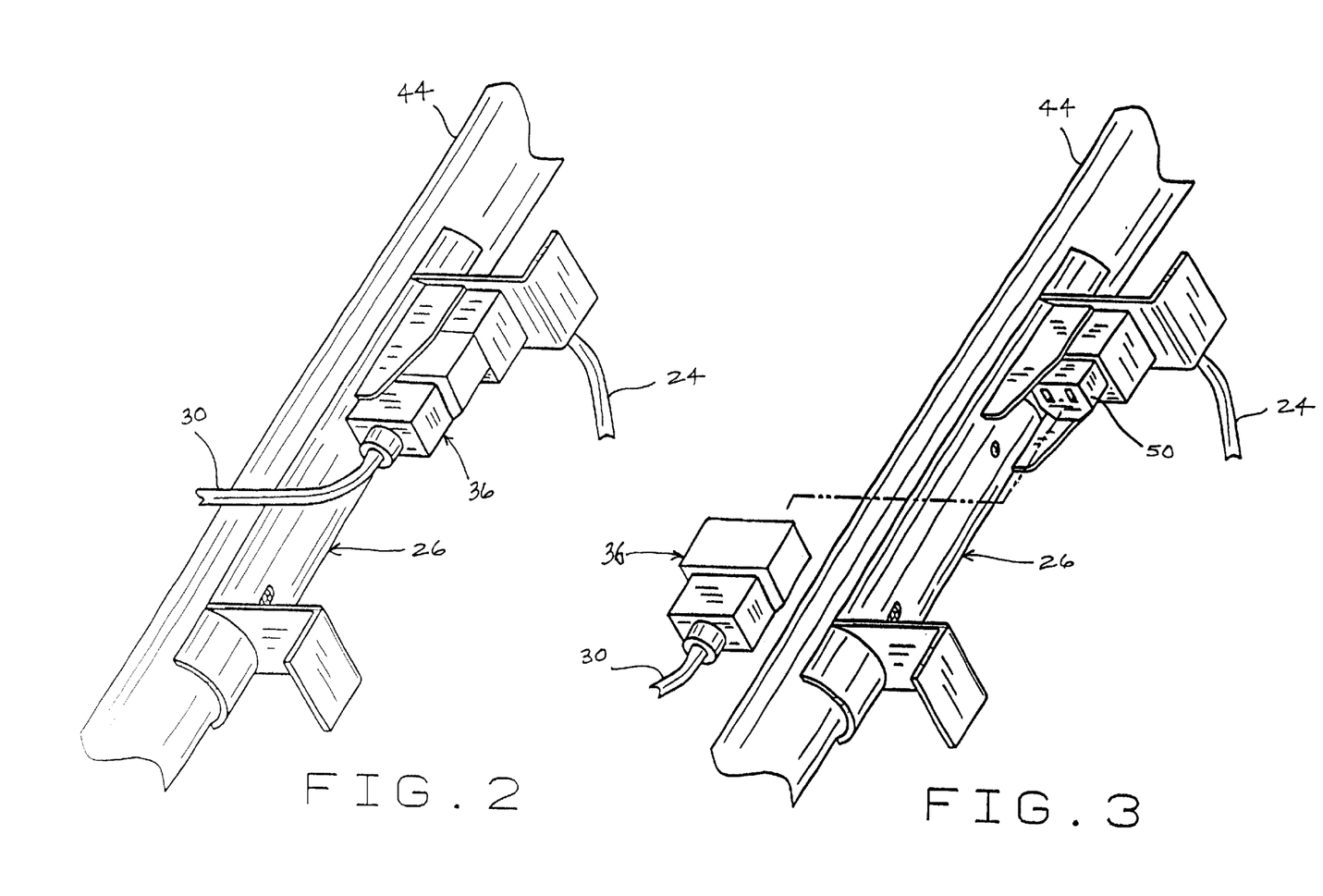
FIG. 2 is an enlarged perspective view of the mounting bracket and electrical connectors shown in FIG. 1.
FIG. 3 is an enlarged perspective view of the mounting bracket and electrical connectors with the electrical connectors disconnected from one another.

With reference to FIGS. 1 through 3, a theft-deterrent ironing system of the present invention generally comprises an electric iron 20, an ironing board 22, an electrical extension cord 24 and mounting bracket 26.

The electric iron 20 has an associated electrical power cord 30 with a first end 32 electrically connected to the iron and a second end 34 connected to a modified male electrical connector 36. With the exception the modified male electrical connector 36, which is described below, the electric iron 20 is standard. For example, Hamilton Beach® UltraSteam™ 15400 series electric irons are suitable for use with the present invention, though other electric irons could be used without departing from the scope of the present invention.

The ironing board 22 is also standard. The ironing board 22 includes a generally flat ironing surface 40 and a pair of support legs 42 and 44 for supporting the ironing surface 40 above the floor. Lower ends of the support legs 42 and 44 include transverse feet 46 and 48, which allow the ironing board 22 to stand on its own. The ironing board 22 depicted in the Figures is preferred, but is only one of many commonly available configurations that could be used without departing from the scope of the present invention.

The electrical extension cord 24 has a modified female electrical connector 50 at one end and a standard male electrical connector 52 at the other end. As shown in FIGS. 2 and 3, the modified female electrical connector 50 is mounted to the ironing board 22 with the mounting bracket 26, which is described below in detail. With the exception of the modified female electrical connector 50, the extension cord 24 is standard. Preferably, the standard male electrical connector 52 is adapted to be plugged into a standard two-pole grounded or ungrounded electrical receptacle (not shown) or other female outlet device. The extension cord 24, electrical power cord 30, modified male electrical connector 36, modified female electrical connector 50, standard male electrical connector 52 and standard electrical receptacle should all meet UL 498 standards or similar standards for attachment plugs and receptacles.

Figure 4:
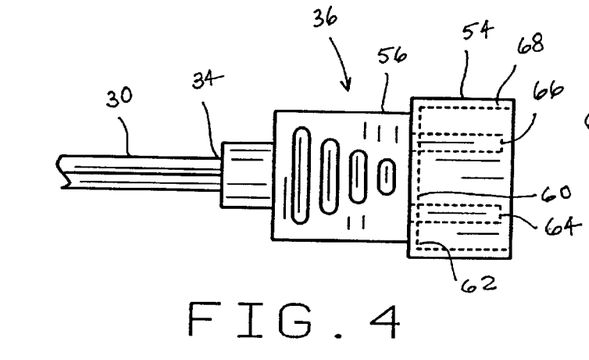
FIG. 4 is a top plan view of the modified male electrical connector shown in FIG. 3.
Figure 5:
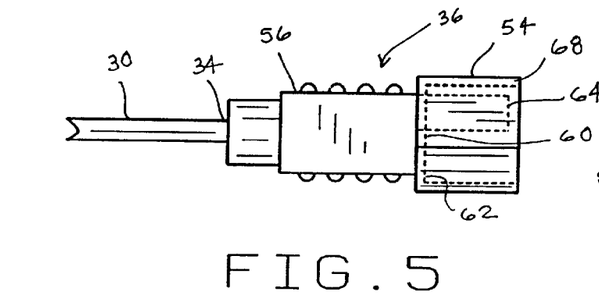
FIG. 5 is a side elevational view of the modified male electrical connector.
Figure 6:
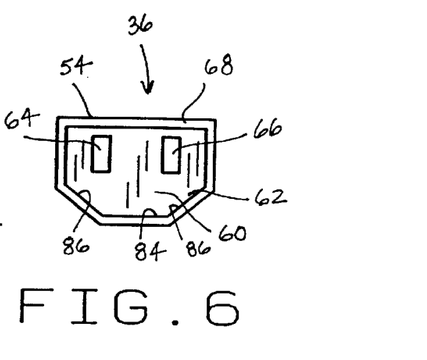
FIG. 6 is a right end elevational view of the modified male electrical connector.

The modified male electrical connector 36 is best illustrated in FIGS. 4 through 6. The modified male electrical connector 36 has a front portion 54 and a rear portion 56. The rear portion 56 of the modified male electrical connector 36 is electrically connected to the second end 34 of the electrical power cord 30 of the electric iron 20. The front portion 54 of the modified male electrical connector 36 has a generally flat front face 60 with a peripheral edge margin 62. A pair of blade-type electrical terminal prongs 64 and 66 project forwardly from the front face 60. A flange or shroud 68 projects forwardly from the peripheral edge margin 62 of the front face 60. As shown in FIGS. 4 and 5, the flange 68 and terminal prongs 64 and 66 extend generally parallel to one another. Preferably, the flange 68 extends completely around the peripheral edge margin 62 of the front face 60 of the modified male electrical connector 36 to define a hood that laterally surrounds the electrical terminal prongs 64 and 66. Also, as shown in FIGS. 4 and 5, the flange 68 preferably projects forwardly of the front face 60 at least as far as the terminal prongs 64 and 66 do.

The flange 68 should be of a material that is sufficiently rigid to resist collapsing during normal use. Preferably, the flange is of a rigid polymeric material, but could be of other non-conductive materials without departing from the scope of the invention. Under normal usage conditions, the flange 68 engages against the area surrounding the terminal slots of a standard female electrical receptacle or outlet, and thereby prevents the electrical terminal prongs 64 and 66 from penetrating the terminal slots of the standard female connector. Thus, the rigid flange 68 prevents use of the modified male electrical connector 36 with a standard female electrical receptacle or outlet.

Figure 7:
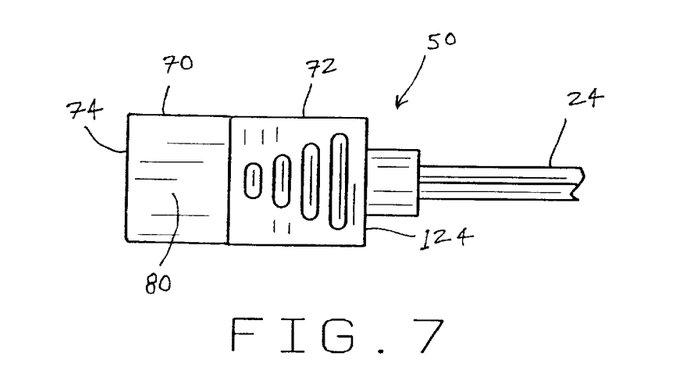
FIG. 7 is a top plan view of the modified female electrical connector shown in FIG. 3.
Figure 8:
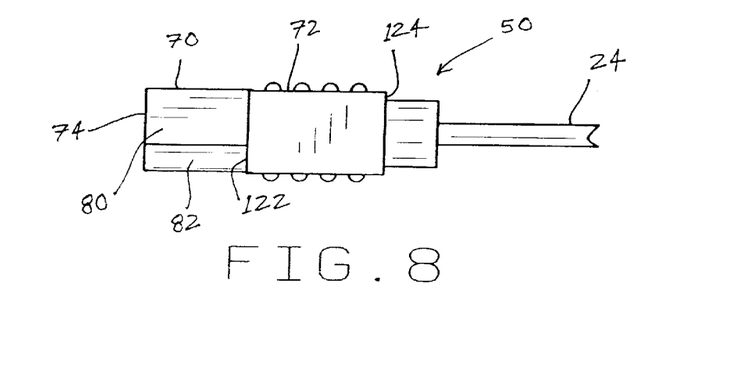
FIG. 8 is a side elevational view of the modified female electrical connector.
Figure 9:
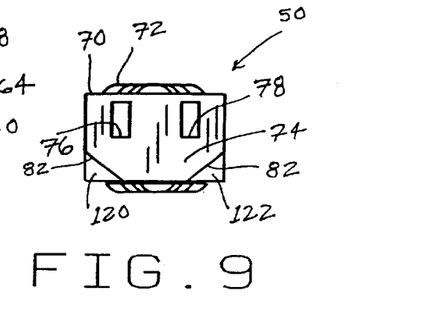
FIG. 9 is a left end elevational view of the modified female electrical connector.
Figure 10:
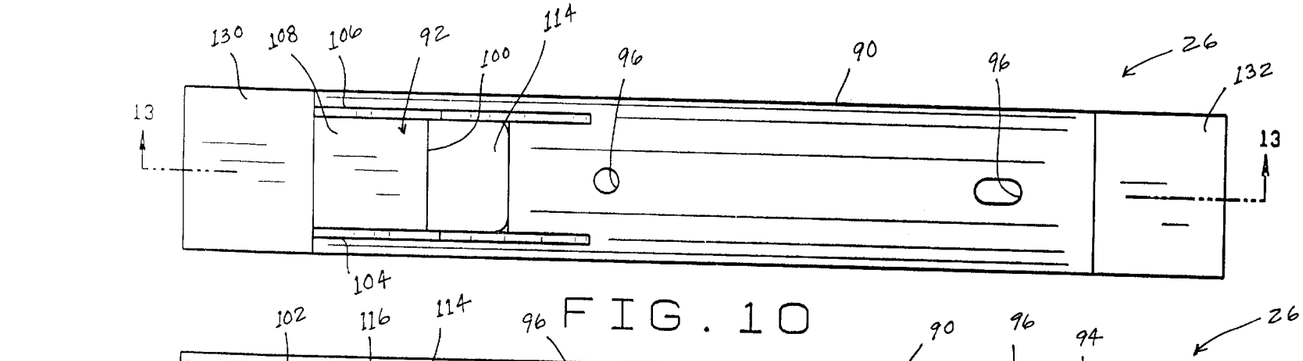
FIG. 10 is a top plan view of the mounting bracket shown in FIGS. 1–3.

The modified female electrical connector 50 is best illustrated in FIGS. 7 through 9. The modified female electrical connector 50 has a front portion 70 and a rear portion 72. The rear portion 72 of the modified female electrical connector 50 is electrically connected to one end of the electrical extension cord 24. The front portion 70 of the modified female electrical connector 50 has a generally flat face 74 with a pair of terminal slots 76 and 78 sized and adapted to receive the terminal prongs 64 and 66 of the modified male electrical connector 36 for temporary electrical connection of the modified male electrical connector 36 and modified female electrical connector 50. The front portion 70 of the modified female electrical connector 50 also has a peripheral side surface 80 extending rearwardly from the face 74 toward the rear portion 72 of the modified female electrical connector 50.

As shown in FIG. 9, peripheral side surface 80 is preferably shaped to give the front portion 70 of the modified female electrical connector 50 a generally rectangular cross-sectional configuration with beveled or chamfered corners 82. The flange 68 of the modified male electrical connector 36 has an interior surface 84 that, together with the front face 60 of the modified male electrical connector 36, defines a chamber. Preferably, the interior surface 84 of the flange 68 is shaped to that the front portion 70 of the modified female electrical connector 50 is received within the chamber when the modified male electrical connector 36 and the modified female electrical connector 50 are connected with one another. As shown in FIG. 6, the interior surface 84 of the flange 68 has a generally rectangular cross-sectional configuration with angled corners 86, which are adapted to engage against the beveled corners 82 of the peripheral side surface 80 of the front portion 70 of the modified female electrical connector 50 when the modified male electrical connector 36 and the modified female electrical connector 50 are connected with one another.

To connect the modified male electrical connector 36 with the modified female electrical connector 50, the terminal prongs 64 and 66 are aligned with the terminal slots 76 and 78. Then, the front portion 54 of the modified male electrical connector 36 is pushed toward the front portion 70 of the modified female electrical connector 50 until the front face 60 of the modified male electrical connector 36 is immediately adjacent the flat face 74 of the modified female electrical connector 50 and the terminal prongs 64 and 66 are received within the slots 76 and 78. Thus, when the modified male electrical connector 36 and the modified female electrical connector 50 are connected with one another, the front portion 70 of the modified female electrical connector 50 is received within the chamber, with the interior surface 84 of the flange 68 fitting over at least a portion of the peripheral side surface 80 of the front portion 70 of the modified female electrical connector 50 and the angled corners 86 of the flange 68 fitting over the beveled corners 82 of the peripheral side surface 80.

The particular shapes and mating cross-sectional configurations of the components described above are preferred. However, it should be understood that a variety of other shapes and cross-sectional configurations could be employed to perform substantially the same function without departing from the scope of the present invention. Also, although the electrical connectors have been shown and described as having only two electrical terminals and no ground prong, electrical connectors having more than two electrical terminals, grounded or ungrounded, could be used without departing from the scope of the invention.

As shown in FIGS. 2 and 3, a mounting bracket 26 is used for mounting the modified female electrical connector 50 to one of the support legs 42 or 44 of the ironing board 22. The mounting bracket 26 is shown in more detail in FIGS. 10 through 15. In general, the bracket 26 has a base portion 90 and a housing portion 92.

The base portion 90 is adapted for mounting the bracket 26 to one of the support legs 42 or 44 of the ironing board 22. As shown in FIGS. 1 through 3, the support legs 42 and 44 having a generally cylindrical shape so, preferably, the base portion 90 of the bracket 26 includes a concave cylindrical surface 94 that is adapted to fit against a portion of one of the support legs. Preferably, the base portion 90 also includes holes 96 for receiving mechanical fasteners (see FIGS. 2 and 3) for fastening the bracket 26 to one of the support legs 42 or 44. The housing portion 92 extends from the base portion 90 of the bracket 26. Preferably, the housing portion 92 and base portion 90 are of a monolithic construction. As explained below, the housing portion 92 is adapted for engagement with the modified female electrical connector 50 in a manner for retaining at least a portion of the modified female electrical connector 50 therein, thereby securing the modified female electrical connector 50 to the mounting bracket 26 and to the ironing board 22.

As shown in FIGS. 10 through 13, the housing portion 92 has front wall 100, a rear wall 102, a pair of spaced side walls 104 and 106, and a top wall 108. Together, the front wall 100, rear wall 102, side walls 104 and 106 and top wall 108 define a housing interior that is shaped and adapted to receive the rear portion 72 of the modified female electrical connector 50. The rear wall 102 includes an aperture 110 and the front wall 100 includes an opening 112. When the modified female electrical connector 50 is received within the housing portion 92 of the bracket 26, the extension cord 24 passes rearwardly through the aperture 110 in the rear wall 102 and the front portion 70 of the modified female electrical connector 50 passes forwardly through the opening 112 in the front wall (see FIG. 12, where the modified female electrical connector is shown in phantom).

Figures 11, 12:
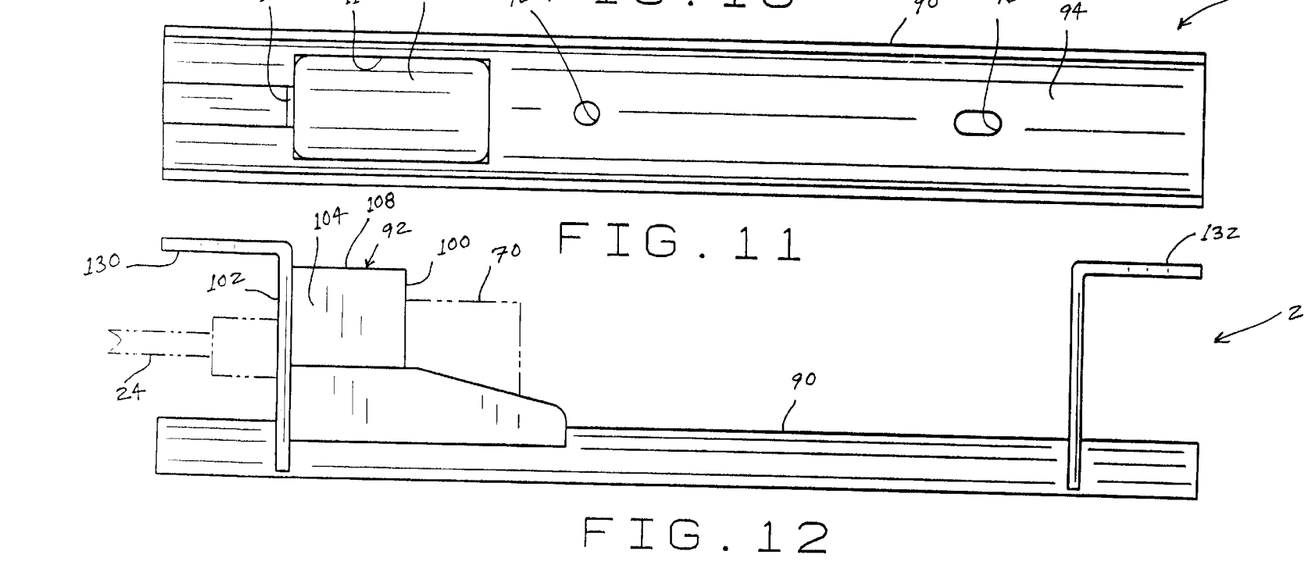
FIG. 11 is a bottom plan view of the mounting bracket.
FIG. 12 is a side elevational view of the mounting bracket, with the modified female electrical connector shown in phantom.
Figure 13:
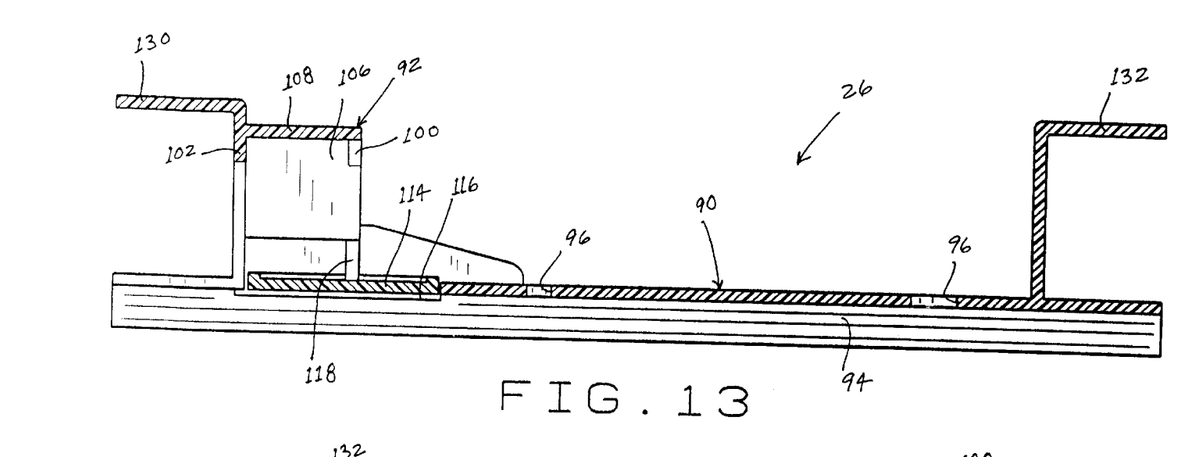
FIG. 13 is a cross-sectional view of the mounting bracket taken along the plane of line 13—13 in FIG. 10.
Figure 14:
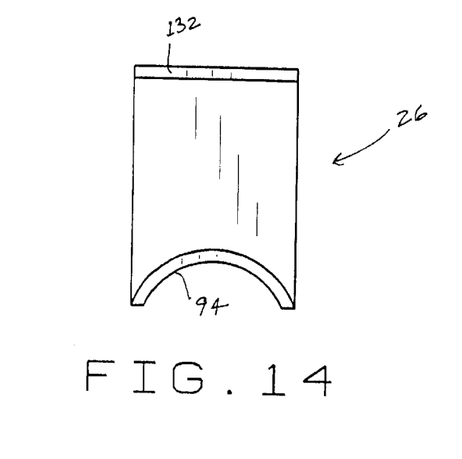
FIG. 14 is a right end elevational view of the mounting bracket.
Figure 15:
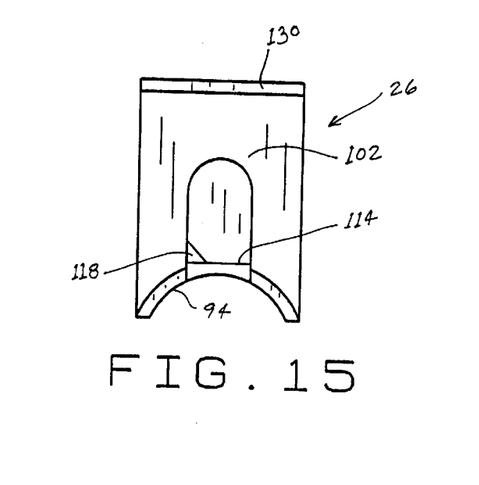
FIG. 15 is a left end elevational view of the mounting bracket.

As best shown in FIGS. 11 and 13, the base portion 90 of the bracket includes a removable access panel 114. The access panel 114 closes an access opening 116 that is used for installing and removing the modified female electrical connector 50. When mounting the bracket 26 to the ironing board 22, the modified female electrical connector 50 is inserted into the housing portion 92 of the bracket 26 through the access opening 116. Then, the access panel 114 is positioned within the access opening 116 so that it rests flush with the concave surface 94 of the base portion 90. When the bracket 26 is mounted securely to one of the support legs 42 or 44 of the ironing board 22, the access panel 114 is inaccessible and, therefore, the modified female electrical connector 50 cannot be removed from the housing portion 92 of the bracket 26 without first disassembling the bracket 26 from the ironing board 22. As shown in FIGS. 13 and 15, the access panel 114 includes a shoulder 118, which is generally aligned with the front wall 100 of the housing portion 92 when the access panel 114 is positioned within the access opening 116.

Preferably, the modified female electrical connector 50 has front facing surfaces 120 and 122 adjacent the beveled corners 82 of the peripheral side surface 80 (see FIGS. 8 and 9) and rear a facing surface 124 adjacent the extension cord 24 (see FIGS. 7 and 8). Preferably, the front wall 100 of the housing portion 92 abuts against the front facing surface 122 of the modified female electrical connector 50, the shoulder 118 of the access panel 114 abuts against the front facing surface 120 of the modified female electrical connector 50, and the rear wall 102 abuts against the rear a facing surface 124 of the modified female electrical connector 50, to retain the modified female electrical connector 50 within the housing interior.

As best shown in FIG. 12, the bracket 26 preferably includes a pair of spaced flanges 130 and 132. The flanges 130 and 132 are angled so that the extension cord 24 can be wound around them when not in use. Preferably, the base portion 90, housing portion 20 and flanges 130 and 132 are of a monolithic construction, molded from a polymeric material, though other materials could be used.

While the present invention has been described by reference to specific embodiments and specific uses, it should be understood that other configurations and arrangements could be constructed, and different uses could be made, without departing from the scope of the invention as set forth in the following claims.

What is claimed is:

1. A theft-deterrent ironing system comprising:
   an electrical extension cord having a modified female electrical connector at one end and a male electrical connector at an opposite end, the modified female electrical connector being adapted for mounting to an ironing board, the male electrical connector being adapted to be plugged into a standard electrical receptacle;

an electric iron having a power cord with a first end electrically connected to the iron and a second end connected to a modified male electrical connector, the modified male electrical connector comprising:
   a front face having a peripheral edge margin;
a pair of electrical terminal prongs projecting forwardly from the front face; and
   a flange projecting forwardly from the peripheral edge margin of the front face generally parallel to the electrical terminal prongs, the flange having an interior surface adapted to fit over at least a portion of the modified female electrical connector when the modified male electrical connector is connected to the modified female electrical connector; and
   a mounting bracket adapted for mounting the electrical extension cord to an ironing board, the bracket having a base portion adapted to be connected to the ironing board, a pair of spaced flanges adapted for holding the electrical extension cord when the electrical extension cord is wound around the pair of spaced flanges, and a housing portion extending from the base portion, the housing portion being adapted for engagement with the modified female electrical connector in a manner for retaining at least a portion of the modified female electrical connector therein, thereby securing the modified female electrical connector to the mounting bracket, wherein one flange of the pair of spaced flanges is integral with the housing portion of the bracket.

2. The ironing system of claim 1 wherein the flange is of a material that is sufficiently rigid to resist collapsing when the modified male electrical connector is connected to the modified female electrical connector.

3. The ironing system of claim 2 wherein the flange is shaped and configured to prevent the modified male electrical connector from being plugged into a standard electrical receptacle.

4. The ironing system of claim 2 wherein the electrical terminal prongs each have a length and flange projects forwardly from the front face of the modified male electrical connector at least the length of the electrical terminal prongs.

5. The ironing system of claim 2 wherein the flange extends completely around the peripheral edge margin of the front face of the modified male electrical connector to define a hood that surrounds the electrical terminal prongs.

6. The ironing system of claim 5 wherein the hood and the front face of the modified male electrical connector define a chamber that is sized and configured to receive at least a front portion of the modified female electrical connector when the modified male electrical connector and the modified female electrical connector are connected with one another.

7. The ironing system of claim 6 wherein the front portion of the modified female electrical connector has a first cross-sectional configuration, and wherein the chamber has a matching second cross-sectional configuration that is shaped to fit around the front portion of the modified female electrical connector when the modified male electrical connector and the modified female electrical connector are connected with one another.

8. The ironing system of claim 1 wherein the mounting bracket is adapted for mounting the modified female electrical connector to the ironing board, the modified female electrical connector having front and rear facing portions, the bracket having a base portion connectable to the ironing board and a housing portion extending from the base portion, the housing portion having spaced front and rear walls defining a housing interior therebetween, the housing interior being shaped and adapted to receive at least a portion of the modified female electrical connector, the front and rear walls of the housing portion being adapted to abut against front and rear facing portions of the modified female electrical connector, respectively, when the modified female electrical connector is received within the housing interior, in a manner to retain the modified female electrical connector within the housing interior, thereby securing the modified female electrical connector to the mounting bracket.

9. A theft-deterrent ironing system comprising:
   an electrical extension cord having a modified female electrical connector at one end and a standard male electrical connector at the other end, the modified female electrical connector being fixedly mountable to an ironing board, the standard male electrical connector being adapted to plug into a standard electrical receptacle;
an electric iron having an electrical power cord, one end of the power cord being electrically connected to the iron and the other end of the power cord including a modified male electrical connector, the modified male electrical connector comprising:
   a front face with a peripheral edge margin;
   a pair of electrical terminal prongs projecting forwardly from the front face; and
   a hood extending around at least a portion of the peripheral edge margin of the front face and projecting forwardly therefrom to at least partially surround the electrical terminal prongs, the hood having an interior surface that is shaped and configured to fit around at least a portion of the modified female electrical connector when the modified male electrical connector is connected to the modified female electrical connector; and
a mounting bracket adapted for mounting the electrical extension cord to an ironing board, the bracket having a base portion adapted to be connected to the ironing board, a pair of spaced flanges adapted for holding the electrical extension cord when the electrical extension cord is wound around the pair of spaced flanges, and a housing portion extending from the base portion, the housing portion being adapted for engagement with the modified female electrical connector in a manner for retaining at least a portion of the modified female electrical connector therein, thereby securing the modified female electrical connector to the mounting bracket, wherein one flange of the pair of spaced flanges is integral with the housing portion of the bracket.

10. The ironing system of claim 9 wherein the electrical terminal prongs and the hood project forwardly from the front face of the modified male electrical connector generally in the same direction.

11. The ironing system of claim 10 wherein the electrical terminal prongs each have a length and the hood projects forwardly from the front face at least the length of the electrical terminal prongs.

12. The ironing system of claim 9 wherein the hood is of a material that is sufficiently rigid to resist collapsing under normal use of the modified male electrical connector.

13. The ironing system of claim 12 wherein the hood is shaped and configured to prevent the modified male electrical connector from being plugged into a standard electrical receptacle.

14. A theft-deterrent ironing system comprising:

an electrical extension cord having a modified female electrical connector at one end and a male electrical connector at the other end; and a mounting bracket for mounting the electrical extension cord to an ironing board, the bracket having a base portion connectable to the ironing board, a pair of spaced flanges adapted for holding the electrical extension cord when the electrical extension cord is wound around the pair of spaced flanges, and a housing portion extending from the base portion, the housing portion being adapted for engagement with the modified female electrical connector in a manner for retaining at least a portion of the modified female electrical connector therein, thereby securing the modified female electrical connector to the mounting bracket, wherein one flange of the pair of spaced flanges is integral with the housing portion of the bracket.

15. The ironing system of claim 14 wherein the modified female electrical connector has front and rear facing portions, the bracket housing portion having spaced front and rear walls defining a housing interior therebetween, the housing interior being shaped and adapted to receive at least a portion of the modified female electrical connector, the front and rear walls of the housing portion being adapted to abut against the front and rear facing portions of the modified female electrical connector, respectively, when the modified female electrical connector is received within the housing interior, in a manner to retain the modified female electrical connector within the housing interior.

16. The ironing system of claim 15 wherein the front wall of the housing portion includes an aperture and wherein a front portion of the modified female electrical connector extends through the aperture and forward of the housing portion.

17. The ironing system of claim 16 further comprising an electric iron having an electrical power cord, one end of the power cord being electrically connected to the iron and the other end of the power cord including a modified male electrical connector, the modified male electrical connector comprising:

a front face with a peripheral edge margin;

a pair of electrical terminal prongs projecting forwardly from the front face; and a flange projecting forwardly from the peripheral edge margin of the front face generally parallel to the electrical terminal prongs, the flange having an interior surface adapted to fit over at least part of the front portion of the female electrical connector when the modified male electrical connector is connected to the modified female electrical connector.

18. The ironing system of claim 17 wherein the flange extends completely around the peripheral edge margin of the front face of the modified male electrical connector to define a hood that surrounds the electrical terminal prongs.

19. The ironing system of claim 17 wherein the flange is of a material that is sufficiently rigid to resist collapsing when the modified male electrical connector is connected to the modified female electrical connector.

20. The ironing system of claim 19 wherein the flange is shaped and configured to prevent the modified male electrical connector from being plugged into a standard electrical receptacle.

21. The ironing system of claim 14 wherein the base portion, housing portion and spaced flanges are of a monolithic construction.

* * * * *

UNITED STATES PATENT AND TRADEMARK OFFICE
CERTIFICATE OF CORRECTION

| | | |
|---|---|---|
| PATENT NO. | : 6,402,547 B1 | Page 1 of 1 |
| DATED | : June 11, 2002 | |
| INVENTOR(S) | : Michael P. DeGutis, James L. Glenn and Brian P. Williams | |

It is certified that error appears in the above-identified patent and that said Letters Patent is hereby corrected as shown below:

<u>Column 10,</u>
Line 15, before "female" please add -- modified --

Signed and Sealed this

Eighteenth Day of February, 2003

JAMES E. ROGAN
*Director of the United States Patent and Trademark Office*